P. SORENSEN & E. N. GILSTRAP.
ANIMAL DETACHER.
APPLICATION FILED APR. 4, 1911.
1,010,198.
Patented Nov. 28, 1911.
2 SHEETS—SHEET 1.
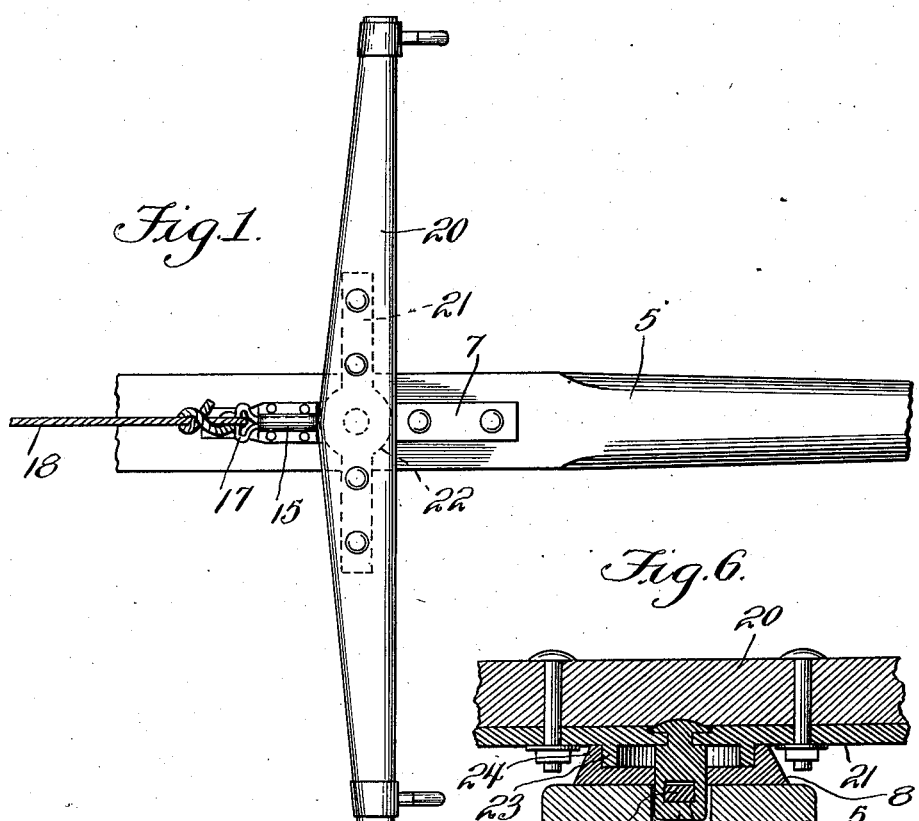
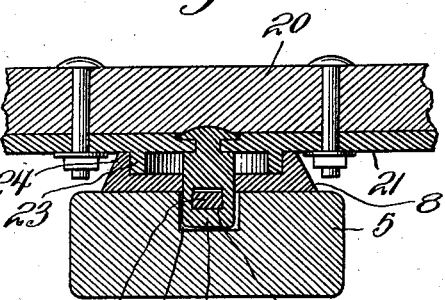
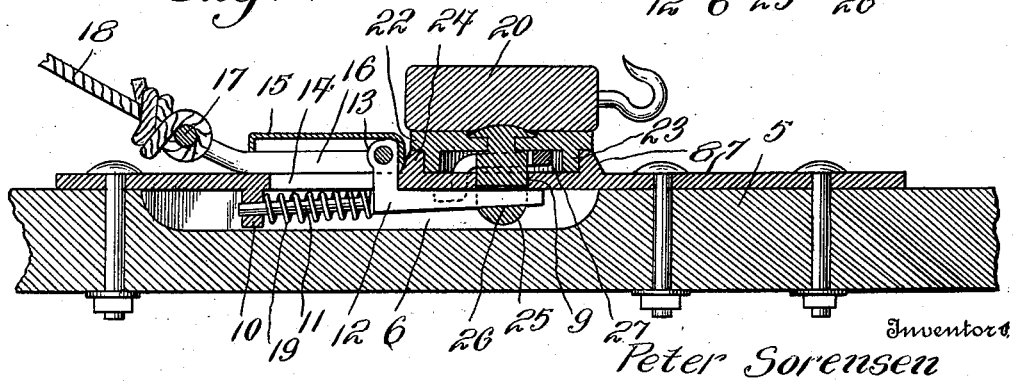
Witnesses
Inventors
Peter Sorensen
Edward N. Gilstrap
By Victor J. Evans,
Attorney

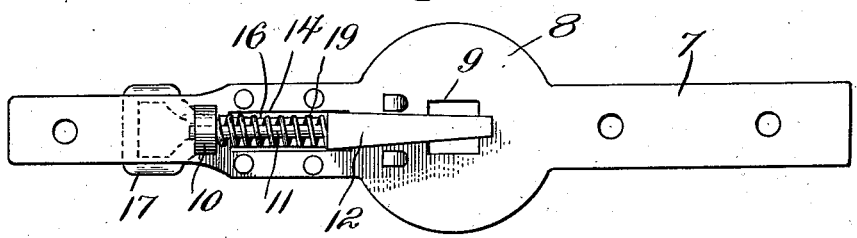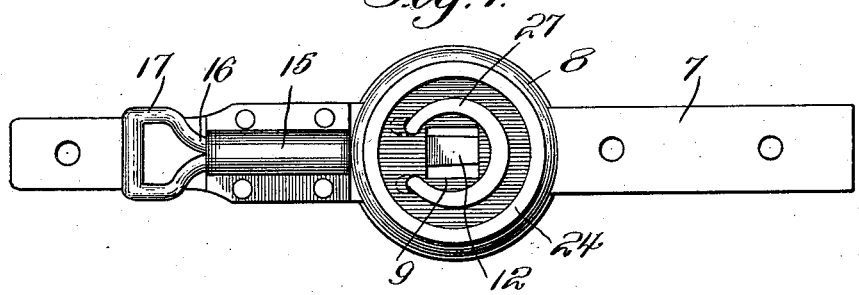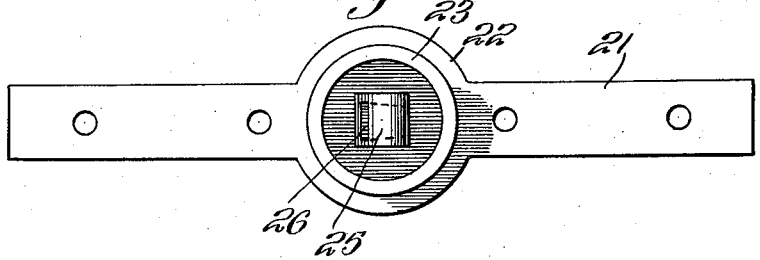

UNITED STATES PATENT OFFICE.

PETER SORENSEN AND EDWARD N. GILSTRAP, OF WOLBACH, NEBRASKA; SAID GILSTRAP ASSIGNOR TO MADS MADSEN, OF WOLBACH, NEBRASKA.

ANIMAL-DETACHER.

1,010,198.  Specification of Letters Patent.  Patented Nov. 28, 1911.

Application filed April 4, 1911.  Serial No. 618,899.

*To all whom it may concern:*

Be it known that we, PETER SORENSEN and EDWARD N. GILSTRAP, citizens of the United States, residing at Wolbach, in the county of Greeley and State of Nebraska, have invented new and useful Improvements in Animal-Detachers, of which the following is a specification.

The invention relates to releasing devices, and more particularly to the class of animal detachers or releasers.

The primary object of the invention is the provision of a device of this character in which the draft animal hitched to a vehicle may be released, should such animal become fractious and attempt to run away, thus obviating injury to or the loss of life of the teamster or the occupants of the vehicle.

Another object of the invention is the provision of a horse detacher of this character in which the double tree supported upon a draft tongue or pole may be released, so as to free such animal from said tongue or pole, thereby preventing an accident, should such animal run away or become unmanageable.

A further object of the invention is the provision of a device of this character which is exceedingly simple in construction, thoroughly reliable and efficient in operation, strong, durable, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a fragmentary top plan view of a draft pole or tongue and its double tree with the device applied thereto constructed in accordance with the invention. Fig. 2 is a vertical longitudinal sectional view through the pole and the device. Fig. 3 is a bottom plan view of the base plate or member of the device removed from the pole. Fig. 4 is a top plan view thereof. Fig. 5 is a bottom plan view of the double tree plate detached from the double tree. Fig. 6 is a fragmentary vertical sectional view through the double tree and the pole.

Similar reference characters indicate corresponding parts throughout the several views of the drawings.

Referring to the drawings by numerals, 5 designates a tongue or pole of a vehicle provided near its rear end with a recess 6, the same being longitudinally disposed therein, and suitably secured to the upper face of the pole or tongue, above the recess, is a base plate 7, the same being formed medially of its length with a circular shaped bearing 8, containing a central squared opening 9, the base plate 7 being provided, rearwardly of the bearing 8, with a depending guide eye 10, in which is slidably mounted the stem 11 of a locking bolt 12, the same being formed with an upturned lug 13, engaging in an elongated slot 14 formed in the base plate 7, longitudinally thereof, and rearwardly with respect to the bearing 8 of the said base plate.

Mounted upon the upper face of the base plate 7, over the slot 14 therein, is a housing 15, in which is slidably fitted a pull trigger 16, the same being suitably engaged at its forward end with the lug 13, while its rear end terminates in a loop or eye 17, to which is connected a pull cable 18, which is of a sufficient length to extend over the dash board of the vehicle, (the dash board and vehicle not being shown), so that the occupants of the vehicle may control the said trigger. It is of course understood that the cable may be trained through a suitable opening in the bottom of the vehicle body and extended in convenient reach of the teamster or occupants of the same, for a purpose as will be hereinafter more fully described.

Surrounding the stem 11 of the locking bolt 12 is a coiled expansion spring 19, one end having its bearing against the locking bolt 12 and its opposite end against the guide eye 10, the locking bolt and the eye 10 being concealed within the recess 6 in the pole or tongue 5, the spring 19 being designed to normally hold the bolt 12 advanced, or in other words, in locking position, but the same may be retracted when a quick jerk or pull is exerted upon the cable 18, for a purpose as will be hereinafter more fully described.

Disposed transversely of the pole or tongue 5 is the usual double tree 20, to the under face of which, and at its center, is fixed a strap iron or plate 21, the latter being formed with a medial turn-table 22, correspondingly shaped to the bearing 8 of the base plate 7, and is formed with an annular depending flange 23, the same being adapted to fit within a corresponding flange 24 rising from the bearing 8 of the said base plate. Thus the double tree 22 may readily turn in the ordinary well-known manner relative to the tongue or pole.

Swiveled or otherwise pivoted, centrally within the turn-table 22, is a depending keeper lug 25, provided with a transverse opening 26, in which is normally engaged the locking bolt 12, it being noted that by reason of the swiveled connection of the keeper lug 25 with the turn table, the latter is free to rotate with respect to the base plate 7. It is also obvious that when the locking bolt 12 carried by the base plate 7 is engaged in the opening 26 in the keeper lug 25, the double tree 20 will be securely connected with the tongue or pole 5, but upon retracting the bolt 12, the said double tree can be readily and conveniently detached from the pole or tongue.

Fixed in the bearing 8 is a yoke-like compression spring 27, which is designed to lift the turn-table 22, so as to disengage its flange 23 from the flange 24 on the bearing 8, when the bolt has been retracted, and thereby disengaging the keeper lug 25 for the positive detachment of the double tree from the pole or tongue.

From the foregoing, it will be seen that the double tree is held firmly in proper position with reference to the tongue or pole 5 for the attachment thereto of the draft appliance in the usual manner. However, by reason of the peculiar mounting and disposition of the double tree with respect to the tongue or pole, it is possible to release the animals in event that they become unmanageable. Assuming that the animals have become frightened or unmanageable, it is only necessary to exert a pull upon the cable 18, thereby causing the locking bolt 12 to retract in the recess 6, whence it will become disengaged from the keeper lug 25, and on the instant of the release of the keeper lug 25, the spring 27 will lift the double tree 20, thereby freeing the same from the tongue or pole, thus detaching said double tree and freeing the animal, so as to obviate any injury or loss of life.

What is claimed is:

1. The combination with a draft pole and double tree, of releasing mechanism comprising a base plate fixed to the pole and having a central bearing provided with a central aperture, a manually controlled spring held locking bolt slidably connected with the base plate at the under face thereof, a circular flange rising from said bearing, a turn-table fixed to the double tree and having a circular flange fitted in the flange on the bearing, and a keeper swiveled centrally to the turn-table and passed through the aperture in the bearing and normally engaged by the locking bolt.

2. The combination with a draft pole and double tree, of releasing mechanism comprising a base plate fixed to the pole and having a central bearing provided with a central aperture, a manually controlled spring held locking bolt slidably connected with the base plate at the under face thereof, a circular flange rising from said bearing, a turn-table fixed to the double tree and having a circular flange fitted in the flange on the bearing, a keeper swiveled centrally to the turn-table and passed through the aperture in the bearing and normally engaged by the locking bolt, means for retracting the bolt to disengage it from the keeper, means for separating the turn-table from the bearing on the release of the bolt, flexible means connected with the means for retracting the bolt, and a spring connected to the bearing and acting upon the turn-table to separate the same on the retracting of the bolt for disengaging it from the keeper.

In testimony whereof we affix our signatures in presence of two witnesses.

PETER SORENSEN.
EDWARD N. GILSTRAP.

Witnesses:
  ED. L. WILSON,
  S. F. WAGNER.

---

Copies of this patent may be obtained for five cents each, by addressing the "Commissioner of Patents, Washington, D. C."